(12) United States Patent
von Gonten

(10) Patent No.: US 10,443,233 B2
(45) Date of Patent: Oct. 15, 2019

(54) SYSTEM AND METHOD FOR A CUBOCTAHEDRON STRUCTURE

(71) Applicant: Charles M. von Gonten, Houston, TX (US)

(72) Inventor: Charles M. von Gonten, Houston, TX (US)

( * ) Notice: Subject to any disclaimer, the term of this patent is extended or adjusted under 35 U.S.C. 154(b) by 0 days.

(21) Appl. No.: 16/036,378

(22) Filed: Jul. 16, 2018

(65) Prior Publication Data

US 2019/0032331 A1 Jan. 31, 2019

Related U.S. Application Data

(60) Provisional application No. 62/537,184, filed on Jul. 26, 2017.

(51) Int. Cl.
| | |
|---|---|
| *E04B 1/98* | (2006.01) |
| *E04B 1/19* | (2006.01) |
| *E04B 1/24* | (2006.01) |
| *E04H 9/02* | (2006.01) |
| *G05D 19/02* | (2006.01) |
| *H04W 84/18* | (2009.01) |

(52) U.S. Cl.
CPC ............ *E04B 1/985* (2013.01); *E04B 1/1906* (2013.01); *E04B 1/2403* (2013.01); *E04H 9/021* (2013.01); *G05D 19/02* (2013.01); *E04B 2001/196* (2013.01); *E04B 2001/2406* (2013.01); *E04H 9/024* (2013.01); *H04W 84/18* (2013.01)

(58) Field of Classification Search
CPC ...... E04B 1/985; E04B 1/1906; E04B 1/2403; E04B 2001/196; E04B 2001/2406; E04H 9/021; E04H 9/024; G05D 19/02; H04W 84/18
USPC ............. 52/80.1, 81.1, 81.3, 167.2, DIG. 10; 403/171
See application file for complete search history.

(56) References Cited

U.S. PATENT DOCUMENTS

| | | | | |
|---|---|---|---|---|
| 2,178,667 A | * | 11/1939 | Littlefield | ................. E04B 1/19 47/83 |
| 2,970,388 A | * | 2/1961 | Yonkers | ............... A63H 33/046 403/171 |
| 3,632,147 A | * | 1/1972 | Finger | ....................... A47F 5/14 403/171 |

(Continued)

*Primary Examiner* — Brent W Herring
(74) *Attorney, Agent, or Firm* — G. Michael Roebuck, PC

(57) ABSTRACT

A system is disclosed comprising a plurality of connected cuboctahedrons forming a column for a building, cuboctahedron comprising a plurality of legs connected by connectors, the first ends of two short sections of a leg are screwed into two separate first and second connector balls, and wherein the first ends of two separate coupling nuts are screwed fully onto the first and second ends of a longer separate section of leg, and wherein the first and second ends of each such longer section of leg, with said coupling nuts screwed fully thereon, are fitted end to end with the second ends of the two short sections of leg already fitted into the corresponding first and second connector balls, first above mentioned, and wherein the first ends of each such coupling nuts are screwed from the first and second ends of the longer section of leg onto the second ends of the short sections of leg first above mentioned which had been screwed into said first and second connector balls.

8 Claims, 9 Drawing Sheets

(56) References Cited

U.S. PATENT DOCUMENTS

| | | | | |
|---|---|---|---|---|
| 3,722,153 | A * | 3/1973 | Baer | E04B 1/32 403/176 |
| 4,027,449 | A * | 6/1977 | Alcalde Cilveti | E04B 1/19 403/171 |
| 4,037,371 | A * | 7/1977 | De La Lande de Calan | E04B 1/3483 52/79.7 |
| 4,131,380 | A * | 12/1978 | De Bliquy | E04B 1/1903 135/114 |
| 4,313,687 | A * | 2/1982 | Martinez Apeztegui | E04B 1/1903 403/171 |
| 4,438,615 | A * | 3/1984 | Wendel | E04B 1/1906 403/171 |
| 4,667,451 | A * | 5/1987 | Onoda | E04B 1/19 52/111 |
| 4,692,054 | A * | 9/1987 | Kirby | E04B 1/1906 403/171 |
| 4,711,062 | A * | 12/1987 | Gwilliam | E04B 1/19 52/646 |
| 4,722,162 | A * | 2/1988 | Wilensky | B64G 9/00 52/652.1 |
| 4,761,929 | A * | 8/1988 | Zeigler | E04H 15/34 52/646 |
| 4,799,339 | A * | 1/1989 | Kobori | E04B 1/985 52/167.2 |
| 4,863,303 | A * | 9/1989 | Croucher, Jr. | E04B 1/1906 403/11 |
| 5,088,852 | A * | 2/1992 | Davister | E04B 1/1906 403/143 |
| 5,107,634 | A * | 4/1992 | Onoda | B64G 1/22 52/1 |
| 5,265,395 | A * | 11/1993 | Lalvani | B44C 3/123 403/176 |
| 5,348,124 | A * | 9/1994 | Harper | B64G 1/36 188/378 |
| 5,448,868 | A * | 9/1995 | Lalvani | A63B 9/00 52/648.1 |
| 5,498,093 | A * | 3/1996 | Imai | E04B 1/1906 403/169 |
| 5,505,035 | A * | 4/1996 | Lalvani | A63B 9/00 52/311.2 |
| 5,540,013 | A * | 7/1996 | Diamond | E04B 1/32 52/646 |
| 5,592,791 | A * | 1/1997 | D'Annunzio | E04B 1/985 52/1 |
| 5,623,790 | A * | 4/1997 | Lalvani | A63B 9/00 52/79.1 |
| 5,632,129 | A * | 5/1997 | Imai | E04B 1/1903 403/169 |
| 5,750,897 | A * | 5/1998 | Kato | F16F 15/02 248/550 |
| 5,921,048 | A * | 7/1999 | Francom | E04C 3/08 242/437.3 |
| 6,173,538 | B1 * | 1/2001 | Fleishman | E04B 1/3211 52/284 |
| 6,282,849 | B1 * | 9/2001 | Tuczek | E04B 1/32 52/648.1 |
| 7,992,353 | B2 * | 8/2011 | Athan | E04B 1/19 403/116 |
| 8,082,938 | B2 * | 12/2011 | Prusmack | E04B 1/32 135/122 |
| 9,212,479 | B1 * | 12/2015 | Pacaci | E04B 1/1903 |
| 2003/0165353 | A1 * | 9/2003 | Clausell | E04B 1/19 403/56 |
| 2007/0163185 | A1 * | 7/2007 | Morley | E04B 1/3205 52/81.1 |
| 2007/0256370 | A1 * | 11/2007 | Whittingham | E04B 1/3211 52/81.1 |
| 2009/0113816 | A1 * | 5/2009 | Kling | A47C 4/022 52/81.3 |
| 2012/0291365 | A1 * | 11/2012 | Rodriguez | E04B 1/00 52/79.9 |
| 2015/0081110 | A1 * | 3/2015 | Houston | G05D 19/02 700/280 |
| 2017/0350112 | A1 * | 12/2017 | Ventrella | E04B 1/1906 |

* cited by examiner

SYSTEM AND METHOD FOR A CUBOCTAHEDRON STRUCTURE

CROSS REFERENCE TO RELATED APPLICATIONS

This patent application bases priority on U.S. Provisional Patent Application No. 62/537,184 by Charles M. von Gonten entitled SYSTEM AND METHOD FOR A CUBOCTAHEDRON-BASED STRUCTURE filed on Jul. 26, 2017.

Aldrin U.S. Pat. No. 5,184,789 entitled Space Station Facility issued on Feb. 9, 1993 is hereby incorporated by reference herein in its entirety. D'Annunzio et al. U.S. Pat. No. 5,592,791 entitled Active Controller for the Attenuation of Mechanical Vibrations issued on Jan. 14, 1997 is hereby incorporated by reference herein in its entirety. Bozich et al. U.S. Pat. No. 5,367,612 entitled Neuro-controlled Adaptive Process Control System issued on Nov. 22, 1994 is hereby incorporated by reference herein in its entirety. In a particular illustrative embodiment of the invention, the counter force actuator (also referred to herein as "actuator") of D'Annunzio is placed inside of the connectors sometime hereinafter referred to as "connector balls". In another illustrative embodiment, the actuators are controlled by a neural network as disclosed in Bozich. Pletner et al. U.S. Pat. No. 6,791,098 entitled "Multi-input, Multi-output Motion Control for Lithography System", which is hereby incorporated by reference herein in its entirety describes a vibration control system having an actuator, and a sensor useful for controlling vibrations in systems.

BACKGROUND OF THE INVENTION

Lighter building structures have been sought that are as strong as and yet extraordinarily lighter than typical building structures.

FIELD OF THE INVENTION

The present invention relates generally to building structures and in particular to lighter building structures incorporating a vibration cancellation system to reduce damage to a structure caused by earthquakes and high winds.

SUMMARY OF THE INVENTION

A plurality of connected cuboctahedrons forming a building column is disclosed, wherein each of the plurality of cuboctahedrons includes but is not limited to a three-dimensional lattice-work of eight (8) uniformly spaced interconnected three-dimensional tetrahedrons separated by six (6) three-dimensional pyramidal-shaped skeletal structures, wherein the three-dimensional structures comprises a plurality of legs connected by connectors, wherein coupling nuts connect the legs to the connectors.

The first ends of two short sections of a leg are screwed into two separate first and second connector balls, and the first ends of the two separate coupling nuts are screwed fulling onto the first and second ends of a longer separate section of the leg, and wherein the first and second ends of the longer section of the leg (with the coupling nuts screwed fully thereon) is fitted end to end with the second ends of the two short sections of the leg already screwed into the first and second connector balls. The second ends of the coupling nuts are screwed from the first and second ends of the longer section of the leg onto the second ends of the short sections of the leg that had been previously screwed into the first and second connector balls. A vibration cancellation system is incorporated into the cuboctahedron-based structure.

DETAILED DESCRIPTION

Figure 1:
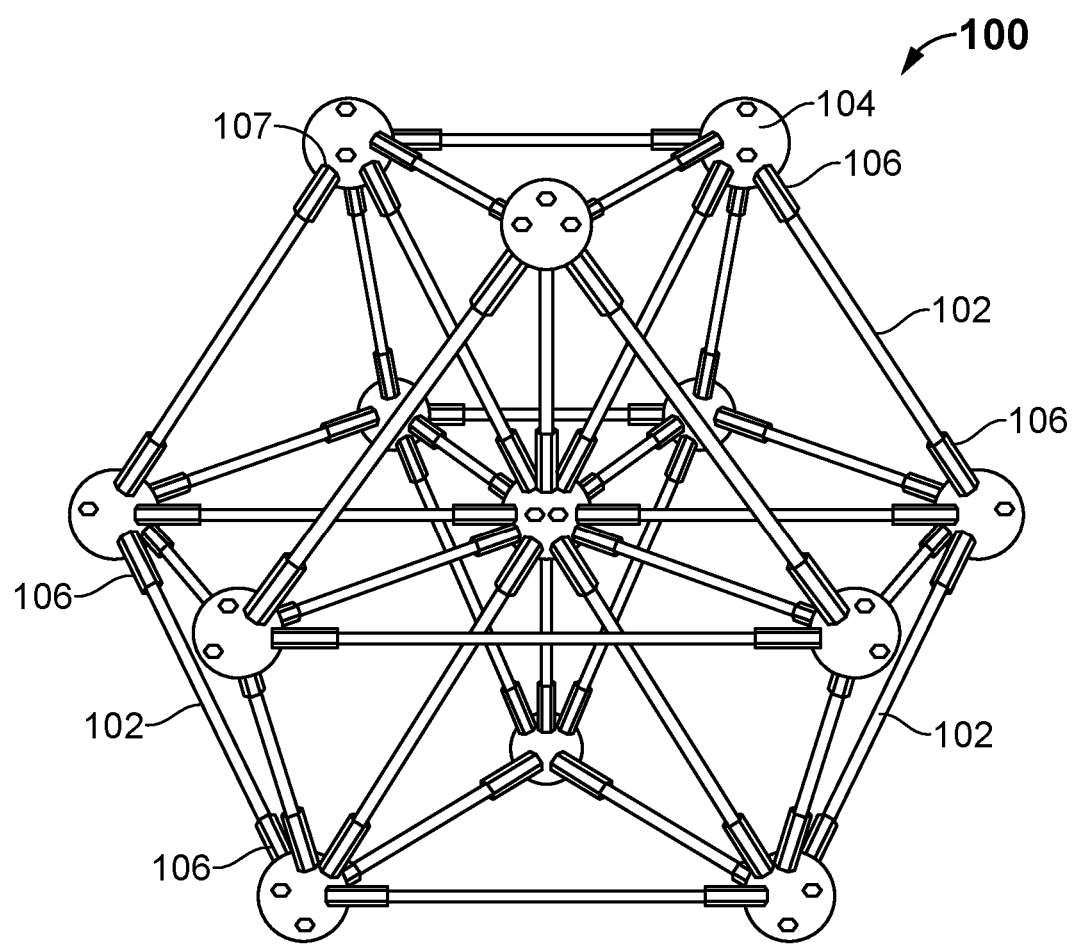
FIG. 1 depicts a side view of a particular illustrative embodiment of the invention of a cuboctahedron made up of legs connected to connectors also referred to as "fasteners" and "connector balls" using couplers to connect the legs to the fasteners.

A particular illustrative embodiment of the invention is disclosed herein wherein a cuboctahedron-based structure having a plurality of elongated members (the elongated members also referred to herein as "legs") are connected using connectors that connect the legs to form the cuboctahedron-based structure, a cuboctahedral-shaped structure. In another embodiment of the invention a vibration cancellation system is incorporated into the cuboctahedron-based structure such as a building or bridge shaking during an earthquake or high wind storm. The vibration cancellation system includes but is not limited to sensors to sense vibration in the structure, actuators to create vibrations to cause vibration cancellation in the structure and a process that monitors the sensors and controls the actuators. The mass is mechanically coupled to the structure. In a particular embodiment, the actuators include but are not limited to a mass and two orthogonal transducers coupled to the mass and arranged to apply force to the mass at a 90 degree angle relative to each other and in a horizontal plane of the structure so that the controller controls the transducers to expand individually to move the mass in orthogonal directions so that each orthogonal transducer induces orthogonal vibrations to induce vibration cancellation into the structure that cancels the vibration sensed by the sensors. In another particular embodiment external sensors are deployed outside of the structure to sense external vibrations and so that the controller controls the transducers to expand individually to move the mass in orthogonal directions so that each orthogonal transducer induces orthogonal vibrations to induce vibration cancellation into the structure that cancels the vibration sensed by the external sensors. In another particular embodiment of the invention, the actuators are hydraulically actuated. In another particular embodiment of the invention, the actuators are electromagnetically actuated. In another particular embodiment of the invention, the actuators are actuated by an electro active polymer. The electro active polymer expands and contracts to cause a mass in the connector to induce vibration cancellation into the cuboctahedron. In another particular embodiment of the invention, the actuators are actuated by piezoelectric polymers such as Polyvinylidene Fluoride (the long-chain molecules which can attract and repel each other when an electrical field is applied) which is one such polymer that could be put to practical use in these instances.

In a particular illustrative embodiment of the invention, the elongated members (also referred to herein as "legs") are all of equal length. Disclosed herein is an apparatus, system and method for an illustrative embodiment of the invention including but not limited to a system and method for a cuboctahedron-based structure that provides a basis for manufacturing and using essentially any type and size of structural material that would be extraordinarily light-weight and extremely strong. Such materials can be made from ferrous or non-ferrous metals, ceramic or any other substances in the building or other manufacturing industries. The cuboctahedron-based structure provides tremendous strength and lightness in that it can be as much as 98% hollow—hence, the structure may weigh as little as 2% of the weight the structure would have weighed had it been constructed as a solid structure of the same material. As mention above, rather than being made solid, a preferred structure is constructed of a three-dimensional lattice-work of uniformly spaced interconnected "tetrahedron" and "pyramidal"—shaped skeletal structures making a basic structural unit from which building materials could be fabricated. Such a basic unit is referred to as a "cuboctahedron". This cuboctahedron is expandable in 14 separate directions which make application of the illustrative embodiments universally applicable to constructing cuboctahedron-based structures that can form walls, beams, and columns and building structures that contain walls and beams made up of connected cuboctahedrons. Such a lattice-work of these illustrative embodiments, combined structures can be fabricated on such a varied scale as to fit any project for which it is being manufactured.

The following describes illustrative embodiments of the invention providing a design concept for an extremely strong and extremely light-weight cuboctahedron-based structure, using a variety of substances, the illustrative embodiments are used in the fabrication and marketing of various construction materials for the following:

(1) very large projects, i.e. structural beams and columns for buildings, bridges, etc., and very large square-foot flooring for buildings, bridges, etc.;

(2) smaller projects, i.e. vehicle frames, frames for airplanes; and (3) even very small delicate electronic parts, etc., where extremely light-weight materials are a necessity.

Figure 2:
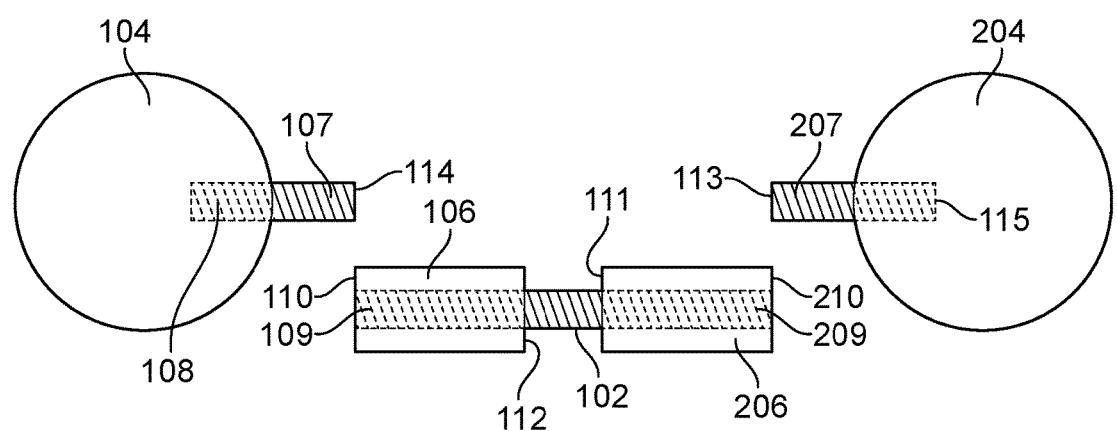
FIG. 2 depicts a side view of a particular illustrative embodiment of the invention of a cuboctahedron made up of legs connected to connectors also referred to as "fasteners" and "connector balls" using couplers to connect the legs to the fasteners.
Figure 9:
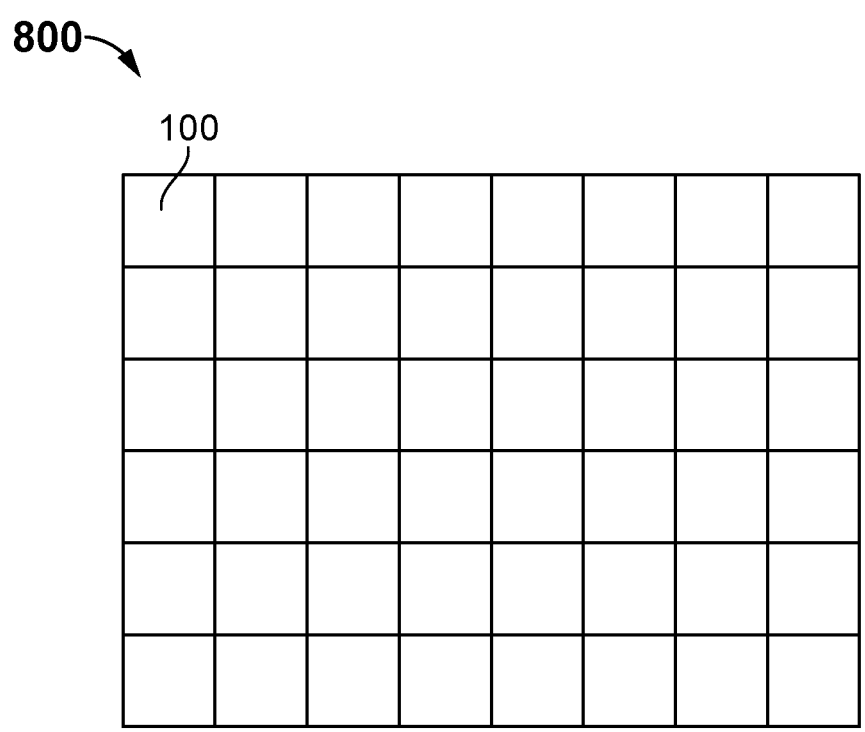
FIG. 9 depicts an illustrative embodiment of the invention wherein a plurality of cuboctahedrons are connected together to form a wall or floor suitable for constructing a building or bridge.

Turning now to FIG. 2, as shown in FIG. 2, in an illustrative embodiment of the invention, the illustrative embodiment is based on interconnected skeletal "cuboctahedrons" to form a cuboctahedron-based structure. The basic configuration of a single skeletal "cuboctahedron" is a three-dimensional structure. As shown in FIG. 2, a particular illustrative embodiment is comprised of eight (8) uniformly spaced three-dimensional "tetrahedrons" (see FIG. 3) with six (6) three-dimensional "pyramids" (See FIG. 4) also uniformly interspaced between the "tetrahedrons" all of which are connected at various points referred to as vertices. FIG. 9 depicts an illustrative embodiment of the invention wherein a plurality of cuboctahedrons are connected together to form a beam suitable for constructing a building wall or beam or a bridge beam. The plurality of connected cuboctahedrons forms a nonplanar surface wherein each of the connected cuboctahedron has a protruding peak and forms an indention formed between an adjacent cuboctahedron protruding peak. Adjacent connected cuboctahedrons surfaces mate into each other so that protruding portions peaks a first one of the connected cuboctahedrons fits into indentions of an adjacent cuboctahedron which resists shear forces perpendicular to a plane through the connected surfaces.

FIG. 9 depicts an illustrative embodiment of the invention wherein a plurality of cuboctahedrons are connected together to form a wall or flooring suitable for constructing a building or bridge.

Each "tetrahedron", with its four equal-lateral triangular sides is scientifically the strongest structural design known to mankind. Therefore, a single "cuboctahedron" which is composed of the unique design of eight (8) such tetrahedrons and six (6) pyramids, as a structural unit, is an incredibly strong, rigid and extremely light-weight structure. Also, an illustrative embodiment contains up to 98% or more, total emptiness, within the confines of an illustrative embodiment's legs (elongated members) and vertices (also referred to herein as "fasteners" and "connectors" and "connector balls"). Hence, the weight of such an illustrative embodiment structure is as little as 2% or less of the weight of a conventional structure of the same material and volume. Only the weight of the legs extending from the "connectors" at the points of the vertices and the connectors themselves comprise the total weight of a single "cuboctahedron". Also, the illustrative embodiments are able to bear compression as well as tension and torque applied from any or all directions with minimal warping. The entire strength of a "cuboctahedron" is due to its substantially angled, aligned and positioned legs. The size of the "cuboctahedron", as well as the diameter and lengths of its legs (also referred to herein as elongated members) and the ultimate size of its "connectors" could be proportionately scaled up or down to properly fit and apply to the size of the project for which it is designed. For instance, to produce a lattice work of "cuboctahedrons" for the production of horizontal beams of a building, a machine can produce a single row of interconnected "cuboctahedrons" on a rather large basis or to produce a double row of them on a reduced scale so as to have the same or greater strength. Conversely, to produce a much smaller project i.e. a very small lattice work for the production of a wall measuring 9' by 15' by 4", a machine produces a three-dimensional array of "cuboctahedrons" which produces a wall of this size. Also, as seen, a "cuboctahedron" has 14 separate faces. Therefore, the cuboctahedron can be expanded outwardly in all 14 directions or any combination of them which makes illustrative embodiment's designs universalin an illustrative embodiment's potential usage.

As shown in FIG. 1, in a particular illustrative embodiment, a "cuboctahedron" 100 is depicted showing the basic structure of a cuboctahedron in an illustrative embodiment of the invention, the cuboctahedron including legs using "full threaded rod" legs 102 and aluminum connector balls 104. It should be understood that the method for constructing a particular illustrative embodiment of a cuboctahedron-based structure, as explained below, is to demonstrate a particular illustrative embodiment of a cuboctahedron-based structure on a relatively larger scale. In a particular embodiment of the invention, the connectors are solid aluminum balls. In another particular illustrative embodiment of the invention, the connectors are hollow and contain an actuator and sensor in data communication with a controller, discussed below. In another illustrative embodiment the legs are hollow and contain wires that enable data communication between the actuators and sensors in the connectors and a processor for vibration cancellation. In another illustrative embodiment a wireless network is provided that enables data communication between the actuators and sensors in the connectors and a processor for vibration cancellation.

FIG. 2 depicts a side view of a particular illustrative embodiment of the invention of a cuboctahedron made up of legs connected to connectors, also referred to herein as "fasteners" and "connector balls". The legs are connected to the connector balls using couplers to connect the legs to the connector balls (fasteners). As shown in FIG. 2, a first connector ball 104 is shown. A short section of leg 107 is screwed into the connector ball 104. A first end 108 of the short section of leg 107 is screwed into the connector ball 104. It is preferred that in constructing a particular embodiment of the invention, to attach "full threaded rod" leg 102 into first the first coupling nut 106 second coupling nut 206 first in constructing a particular embodiment of the invention. A first end 109 of a longer section of leg and a first end 112 and a second end 110 of first coupling nut 106 are shown. A first end 111 and second end 210 of a second coupling nut 206 are shown. A short section 207 of leg is screwed into a second connector ball 204. The short section 207 has a first end 115 and a second end 113. The first end 115 of the second short section of leg 207 screws into the second connector ball 204. The first end 109 of the longer section of leg 102 and a first end 112 of a second end 110 of the first coupling nut 106 are shown. A first end 111 and the second end 210 of the second coupling nut 206 are shown. Each of the first and second coupling nuts is screwed onto each end of the long section of leg 102. Upon alignment of the first end 109 and second end 209 of the longer section of leg 102 with both second ends 113 and 114 of the short sections of legs 107 and 207, then each of the two coupling nuts 106 and 206 are screwed from the longer section of leg 102 onto the second ends 113 and 114 on the short sections of legs 107 and 207.

Figure 4:
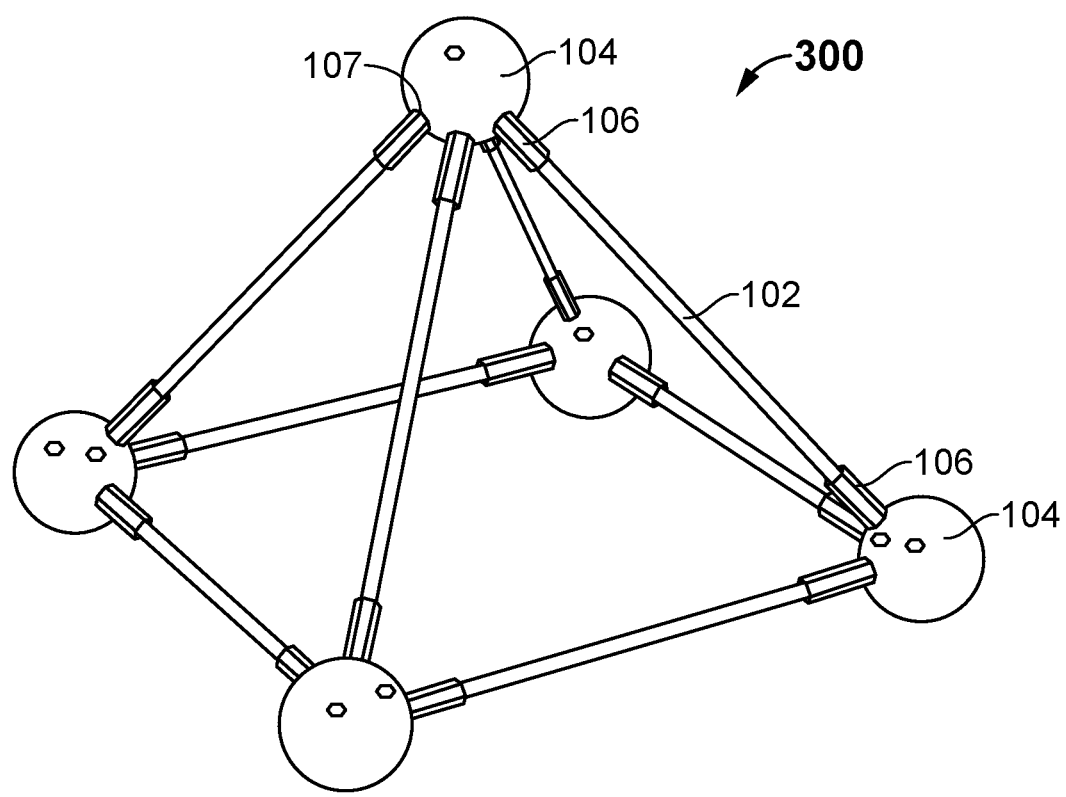
FIG. 4 depicts a side view of a particular illustrative embodiment of the invention of a three-dimensional pyramid.
Figure 5:
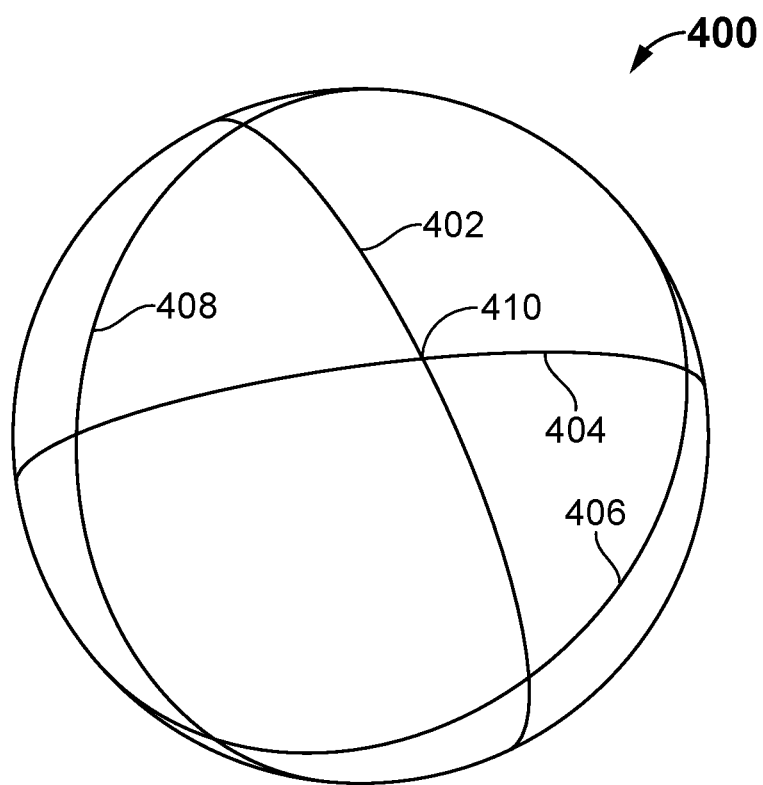
FIG. 5 depicts front view of a connector in an illustrative embodiment of the invention showing locations for holes in the connector for connecting legs to the connector.

FIG. 5 depicts an illustrative embodiment of the invention for a connector 400 in a particular illustrative embodiment of the invention, wherein four (4) separate circumferences 402, 404, 406 and 408 are depicted around the connector ball. Assume that the circumference 404 is an equator of sorts. Six (6) ¼" diameter holes are drilled and tapped (¼-20) to a depth of ½ inch around the circumference of the 1½ inch-aluminum connector ball at 60-degree intervals as indicated by the equatorial circumference line 404 on the connector ball. After drilling and tapping the first six (6) holes, at 60-degree intervals along the original equatorial circumference line 404, rotate the connector ball along circumference line 404 to the circumference line 402, and at an angel of 60 degrees as shown in FIG. 4, drill and tap similar holes along circumference line 402 at 60-degree intervals. Note, that only 4 holes need to be drilled and tapped along circumference line 402 as two holes were drilled and tapped when circumference line 404 was drilled. Then in like manner, rotate the connector ball along circumference line 402 to the circumference line 408 and at an angle of 60 degrees as shown in FIG. 5, drill and tap similar holes along circumference line 408 at 60-degree intervals. Note that only 2 holes need to be drilled and tapped along circumference line 408 as four holes were drilled and tapped when circumference lines 404 and 402 were drilled. All holes should preferably be drilled at the substantially exact intersections of all three above-mentioned circumference lines yielding 12 holes per aluminum connector ball. In order to complete one cuboctahedron, 13 such aluminum connector balls are prepared in the manner just described. The aluminum connector balls can be made of other materials and can be made hollow in order to contain a sensor and actuator in data communication (exchanging data with) a processor.

In a particular illustrative embodiment, each of the connectors are in data communication with at least some or all of other connectors used in the cuboctahedron-based structure so that a processor monitors the sensors and controls the actuator to perform vibration cancellation on the cuboctahedron-based structure or larger structure made up of a plurality of cuboctahedrons. "Data communication" is used herein to mean that data is exchanged over a wire or a wireless network connection between two structural elements (sensor, actuator and processor, etc.). In a particular embodiment of the invention, hard wiring is provided between structural elements such as the sensors, actuators and processor that provides data communication between structural elements such as sensors, actuators and processor. In another embodiment of the invention a wireless network is provided with structural elements such as sensors, actuators and the controller processor that provides data communication between structural elements such as sensors, actuators and controller processor.

As shown in FIG. 1, in a particular illustrative embodiment, an aluminum ball is provided as a connector between legs at the vertices of the legs in the cuboctahedron-based structure in a particular illustrative embodiment of the invention. As shown in FIG. 1, into each ½ inch-deep hole, on each aluminum connector ball (connector), a 1-inch long ¼-20 aluminum "full threaded rod" is screwed leaving ½ inch protruding from the connector ball. A 1" long steel ¼-20 "coupling nut" is to be threaded fully onto each end of a 5-inch long ¼-20 aluminum "full threaded rod". As each 5-inch long "full threaded rod" is held end to end between two ½-inch long "full threaded rods" (protruding from two aluminum ball connectors), each "coupling nut" is to be threaded from the 5-inch long "full threaded rod" onto the two ½-inch long protruding "full threaded rods". Before connecting all of the aluminum balls with the 5-inch long "full threaded rods", it is preferred that the aluminum connector balls are "oriented" in the same direction. In another illustrative embodiment the coupling contains a sensor and actuator in data communication with a processor to perform vibration cancellation in a cuboctahedron-based structure, such as a building or bridge shaking during an earthquake or high wind storm.

As described above, in particular illustrative embodiments of a system and method are disclosed for constructing a single "cuboctahedron" model made entirely of threaded rods, couplings and aluminum connector balls. Other system and method embodiments which are easily assembled and manufactured are contemplated. Different materials the cuboctahedron-based structure disclosed herein using different compression and tension properties are contemplated. More flexible cuboctahedron section legs that form the cuboctahedron can be combined with less flexible cuboctahedron section legs in the same cuboctahedron to form a beam or wall made up of adjacent cuboctahedrons that have specific flexibility characteristics for a particular application such as earthquake, hurricane and tornado resistant, which will be an enormous savings in costs of materials and heavy construction equipment. Any industry should be vastly interested in manufacturing an extremely light-weight and extremely strong material designed to fabricate, for example, a continuous beam of interconnected "cuboctahedrons" which could span a distance of 20-30 feet or flooring that could span hundreds of square feet. Any number of such "cuboctahedrons", of whatever size, can be interconnected together into a substantially infinite variety of "three-dimensional" matrices. Ultimately, this "cuboctahedron"—based concept is used to manufacture structures of whatever material, shape or length, limited only to a design or architectural engineer's imagination and mechanical ability. Furthermore, such structure could essentially replace all traditional solid materials currently used in most, if not all, manufacturing and construction projects today.

The following are statistics for a particular illustrative embodiment as described herein. All measurements shown below are measured between the centerlines of the legs and center points of the aluminum ball connectors. Height (with its base being a side of one of its "tetrahedrons")=approximately 12.25 inches. Height (with its base being a square base of one of its "pyramids")=approximately 10.6 inches. Length of each of its legs (center of aluminum ball connectors)=approximately 7.5 inches. Weight (approximately)=55 (5.1/2) lbs. Volume (within the centerlines of its legs and aluminum ball connectors)=994.37 cubic inches. Steel (for example) weighs about 0.2904 lbs. per cubic inch; consequently, 994.37 cubic inches of steel would weigh approximately 288.76 lbs. Therefore, this model weighs a mere 1.9% of the same volume of steel.

The present invention relates to a System and Method for a Cuboctahedron-based Structure, including but not limited to a) a three-dimensional lattice-work of uniformly spaced interconnected "tetrahedron" and "pyramidal"—shaped skeletal structures making a basic structural unit from which any structure could be fabricated; b) each of the skeletal structures are connected at various vertices via nodal joints (also referred to herein as "connectors" and "fasteners") such as aluminum balls; c) cuboctahedron could be expanded in 14 separate directions so that it is universally acceptable to fit any project for which it is being manufactured; d) the entire structure is made hollow so that it would be extraordinarily light-weight and extremely strong; e) the material could be made from ferrous or non-ferrous metals, ceramic or any other substances in the building or other manufacturing industries; f) the method of construction includes drawing four circumferential lines on the aluminum ball wherein 12 holes are drilled at the exact intersections of the circumferential lines. One complete cuboctahedron-based structure is assembled using 13 such aluminum connector balls with holes, couplings and threaded rods forming a column, wall or support beam from a plurality of cuboctahedrons.

Advantages: Savings in costs of materials and heavy construction equipment, lightweight and provides flexibility characteristic and anti-vibration for applications such as earthquake and tornado resistance.

In another particular embodiment of the invention, each of a plurality of connectors (also referred to as "fasteners") are used to connect legs (also referred to as "elongated members") into a cuboctahedron, contain an actuator and a sensor wherein the connectors are used to connect a plurality of legs to construct a plurality of cuboctahedrons. In a particular illustrative embodiment, each actuator includes but is not limited to a set of two orthogonal actuators connected to a mass that is mechanically coupled to the structure. Each of the actuators and sensors in each of the plurality of connectors are in data communication with a controller (also referred to herein as a "processor") and wherein each of the sensors are read by and each of the actuators are controlled by the controller wherein the controller includes but is not limited to a processor, a computer readable medium, data storage and input output ports. In another particular embodiment the computer readable medium contains a computer program that when executed by the processor reads the sensors and controls the actuators to perform vibration cancellation in the structure to reduce vibrations and damage caused by the vibrations to a structure built from a plurality of cuboctahedrons.

Aldrin U.S. Pat. No. 5,184,789 entitled Space Station Facility issued on Feb. 9, 1993 is hereby incorporated by reference herein in its entirety. D'Annunzio et al. U.S. Pat. No. 5,592,791 entitled Active Controller for the Attenuation of Mechanical Vibrations issued on Jan. 14, 1997 is hereby incorporated by reference herein in its entirety. Bozich et al. U.S. Pat. No. 5,367,612 entitled Neuro-controlled Adaptive Process Control System issued on Nov. 22, 1994 is hereby incorporated by reference herein in its entirety. In a particular illustrative embodiment of the invention, the counter force actuator (also referred to herein as "actuator) of D'Annunzio is placed inside of the connectors. In another illustrative embodiment, the actuators are controlled by a neural network as disclosed in Bozich. Pletner et al. U.S. Pat. No. 6,791,098 entitled "Multi-input, Multi-output Motion Control for Lithography System", which is hereby incorporated by reference herein in its entirety, describes a vibration control system having an actuator, a sensor useful for controlling vibrations in systems. Pletner discloses a vibration control system having an actuator, a sensor useful for controlling vibrations in systems. The actuator may comprise one or more plates or elements of electroactive material bonded to an electrode sheet. Inventions described in these patents listed above and incorporated herein by reference, are combined and modified in accordance with particular embodiments invention described herein.

In a particular illustrative embodiment of the present invention, the cuboctahedron-based structure of Aldrin is provided and modified in accordance with the instant disclosure to implement the system and method of the present invention. In another particular illustrative embodiment of the invention, the fasteners and elongated members as disclosed in Aldrin are provided and modified in accordance with the instant disclosure to implement the system and method of the present invention. In another particular embodiment, the active controller for the mechanical vibrations, including but not limited to the orthogonal feed forward control system and actuator system disclosed in D'Annunzio, is provided and modified in accordance with the instant disclosure to implement the system and method of the present invention. In another particular embodiment, neurocontrolled adaptive process control system, including but not limited to the adaptive process control system as disclosed in Bozich et al. including but not limited to vibration sensors, vibration generators and artificial neural system (ANS) is provided and modified in accordance with the instant disclosure to implement the system and method of the present invention. The transducers of Bozich are also referred to as actuators herein when used in the system and method of the present invention.

Figure 3:
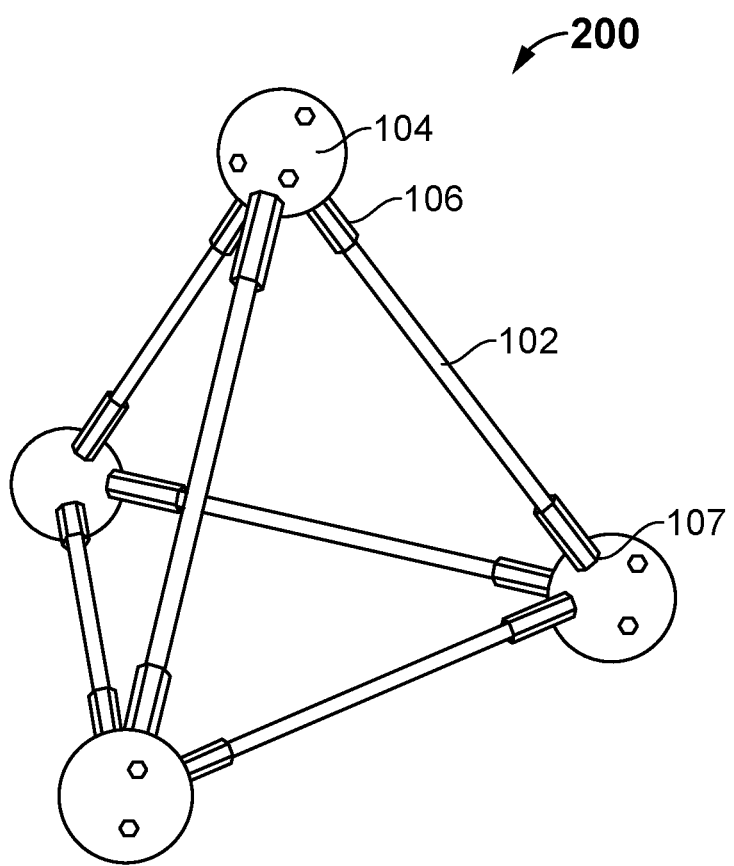
FIG. 3 depicts a side view of a particular illustrative embodiment of the invention of a three-dimensional tetrahedron.

FIG. 3 depicts a side view of a particular illustrative embodiment of the invention of a three-dimensional tetrahedron.

FIG. 4 depicts a side view of a particular illustrative embodiment of the invention of a three-dimensional pyramid.

FIG. 5 depicts front view of a connector in an illustrative embodiment of the invention showing locations for holes in the connector for connecting legs to the connector.

Figure 6:
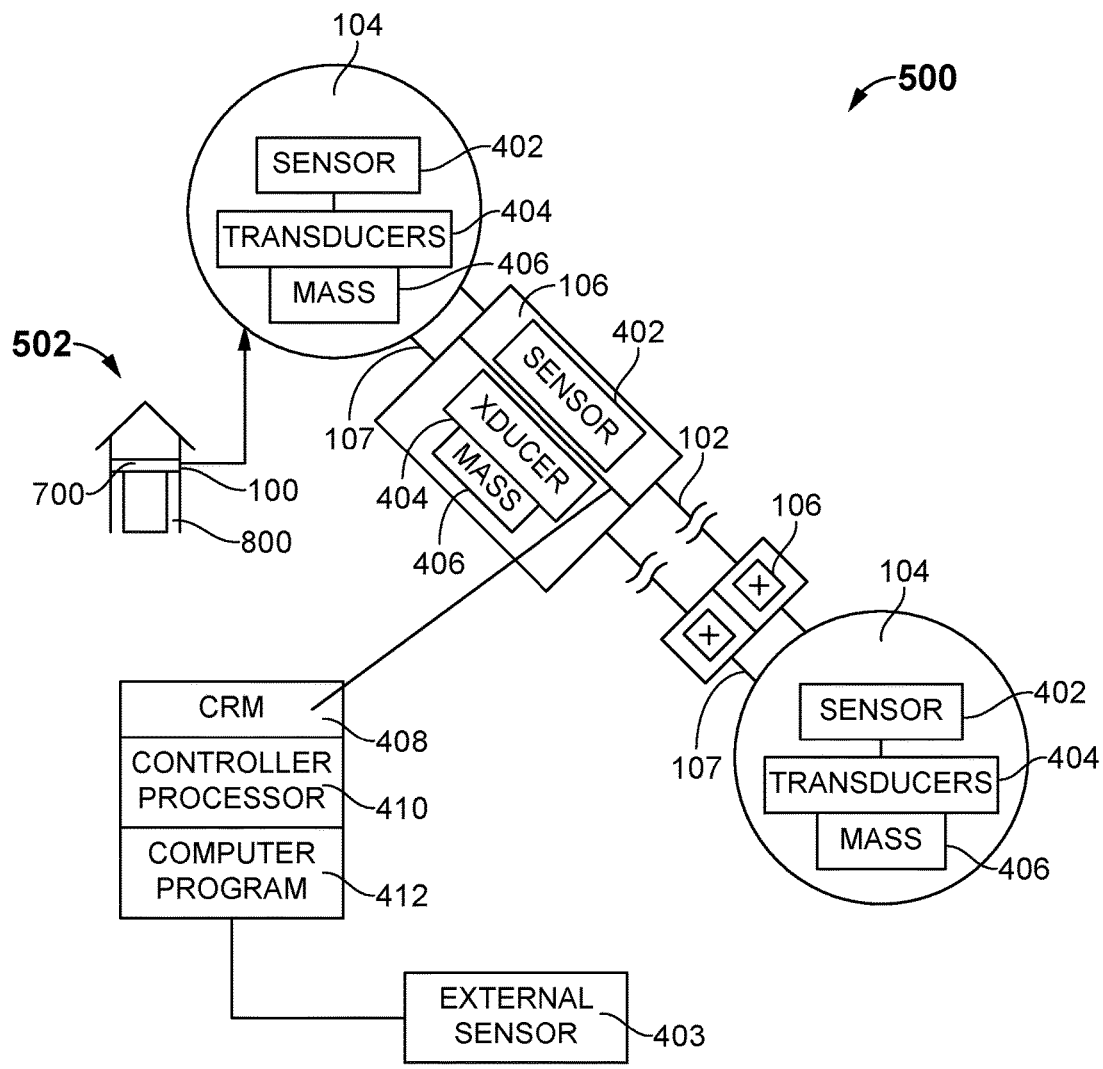
FIG. 6 depicts a schematic depiction of a particular illustrative embodiment of the invention wherein connectors are attached to legs at the vertices of a cuboctahedron-based structure and wherein the cuboctahedron is further comprised of a vibration cancellation system.

Turning now to FIG. 6, in a particular illustrative embodiment of the invention 500, the sensors 402 and actuators 404 (also referred to as orthogonally positioned "transducers" that move an antivibration mass 406 in orthogonal directions relative to each other) are housed in the connectors 104 (also referred to as fasteners) that connect the legs 102 (also referred to herein as "elongated members").

In another illustrative embodiment, the sensors and actuators are housed in the coupling nuts 106 that connect the legs to the connectors that form the cuboctahedron. The sensors and actuators that are housed in the connectors in "data communication", meaning that the sensors and actuators exchange data with a processor. The processor includes but is not limited to a controller 410, computer readable medium 408 and computer program 412 stored in the computer readable medium. The sensors and actuators are connected to each other and the controller by a hard wire to perform data communication. In another embodiment the sensors and actuators are connected to each other and the controller by a wireless network to perform data communication.

As shown in FIG. 6, an exploded view of a connector and leg and coupler from a building 502 having a column 800 and a beam 700 made up of cuboctahedrons 100 in a particular illustrative embodiment of the invention each coupling nut 106 includes but is not limited to a sensor 402 and actuator. Each actuator includes but is not limited to a set of orthogonal transducers 404 and the antivibration mass 406 mechanically coupled to the connector 104 which mechanically couples vibration cancelling vibrations induced in the mass by the controller, actuator, mass and orthogonal transducers from the mass into the cuboctahedron-based structure, the beam 700, column 800 and the building 502. External sensors 403 are provided to sense vibrations outside of the structure, such as vibrations caused in the earth by an earthquake or tornado. A controller (processor) 410, computer readable medium 408 and computer program 412 stored in the computer readable medium are provided to read sensors and send control commands to the actuators to produce vibration cancellation of the vibrations sensed by the sensors 402 and external sensors 403 in the cuboctahedron-based structure. A short leg section 107 screws into a hole in the connector 104 on a first end of the short leg section and into the coupling nut (also referred to herein as a "coupler") on a second end of the short leg section 107.

Figure 7:
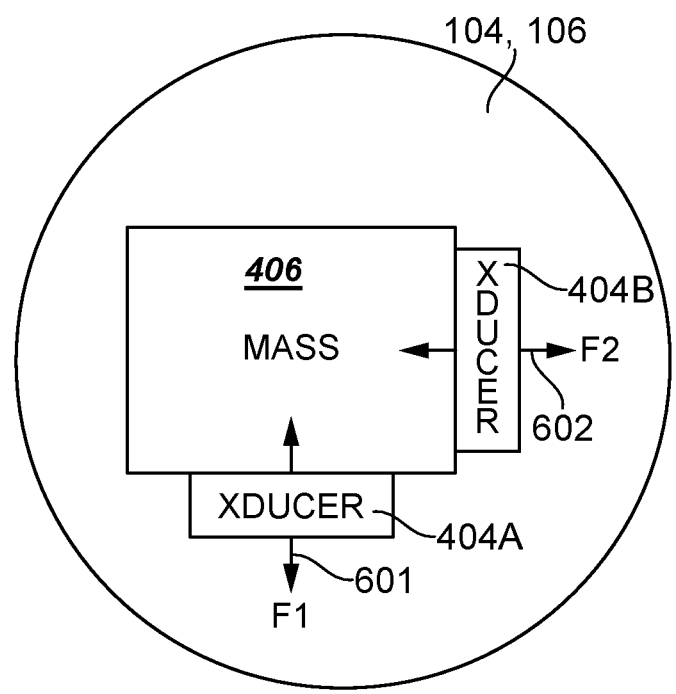
FIG. 7 depicts a schematic depiction of a particular illustrative embodiment of the invention wherein a mass is moved in orthogonal directions by actuators, masses and transducers acting on the mass to create vibration cancellation in a cuboctahedron-based structure to which the mass is mechanically coupled.

Turning now to FIG. 7, in a particular illustrative embodiment a mass 406 is acted on by transducer 404A to cause vibration in a first direction 601 and transducer 404B in a second direction 602, oriented 90 degrees from the first direction, wherein the first and second directions line in a plane of the mass wherein the plane of the mass is parallel to a horizontal plane of a building containing the cuboctahedron-based structure(s). In another embodiment the plane of the mass is not parallel to the horizontal plane of the building containing the cuboctahedron-based structure. The mass is mechanically coupled to the cuboctahedron-based structure.

The present inventions can be realized in hardware, software, or a combination of hardware and software. In a specific embodiment, a system according to the present inventions can be realized in a centralized fashion in one computer system, or in a distributed fashion where different elements are spread across several interconnected computer systems. Any kind of computer system or other apparatus adapted for carrying out the methods and inventions described herein may be used for purposes of the present inventions. A typical combination of hardware and software could be a general-purpose computer system with a computer program that, when being loaded and executed, controls the computer system such that it carries out the methods and inventions described herein.

Figure 8:
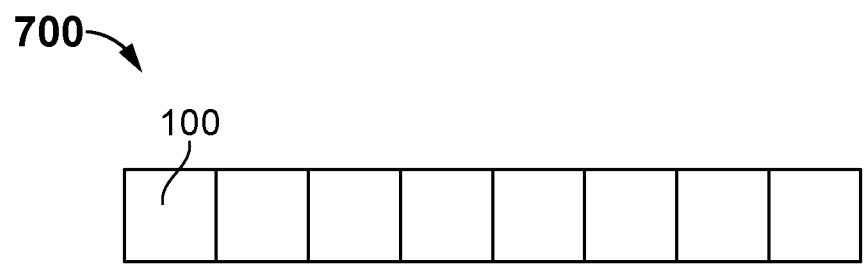
FIG. 8 depicts an illustrative embodiment of the invention wherein a plurality of cuboctahedrons are connected together to form a beam (also referred to as a column) suitable for constructing a building or bridge.

FIG. 8 depicts an illustrative embodiment of the invention wherein a plurality of cuboctahedrons are connected together to form a beam suitable for constructing a building or bridge.

FIG. 9 depicts an illustrative embodiment of the invention wherein a plurality of cuboctahedrons are connected together to form a wall or flooring suitable for constructing a building or bridge.

The figures herein include block diagram and flowchart illustrations of methods, apparatus(s) and computer program products according to various embodiments of the present inventions. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus may be used to implement the functions specified in the block, blocks or flow charts. These computer program instructions may also be stored in a computer-readable medium or memory that can direct a computer or other programmable data processing apparatus to function in a particular manner, such that the instructions stored in the computer-readable medium or memory produce an article of manufacture including instructions which may implement the function specified in the block, blocks or flow charts. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block, blocks or flow charts.

Those skilled in the art should readily appreciate that programs defining the functions of the present inventions can be delivered to a computer in many forms, including but not limited to: (a) information permanently stored on non-writable storage media (e.g., read only memory devices within a computer such as ROM or CD-ROM disks readable by a computer input/output (I/O) attachment); (b) information alterably stored on writable storage media (e.g., floppy disks and hard drives); or (c) information conveyed to a computer through communication media for example using wireless, baseband signaling or broadband signaling techniques, including carrier wave signaling techniques, such as over computer or telephone networks via a modem, or via any of the networks included within the system discussed above.

The term "executable" as used herein means that a program file is of the type that may be run by the processor. In specific embodiments, examples of executable programs may include without limitation: a compiled program that can be translated into machine code in a format that can be loaded into a random access portion of the memory and run by the processor; source code that may be expressed in proper format such as object code that is capable of being loaded into a random access portion of the memory and executed by the processor; or source code that may be interpreted by another executable program to generate instructions in a random access portion of the memory to be executed by the processor. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory may include both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In a specific embodiment, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the programs and other various systems, components and functionalities described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

Any logic or application described herein that comprises software or code can be embodied in any non-transitory computer-readable medium, such as computer-readable medium, for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present inventions, a "computer-readable medium" may include any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random-access memory (SRAM) and dynamic random-access memory (DRAM), or magnetic random-access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In addition to the above description of the network, it may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The computer may also include an input/output interface coupled to the bus and also coupled to one or more input/output devices, such as a display, a touchscreen, a mouse or other cursor control device, and/or a keyboard. In certain specific embodiments, further examples of input/output devices may include one or more display terminals, keypads, touchpads, scanning devices, voice or optical recognition devices, or any other devices suitable for entering or accessing data by one or more computers. Multiple input/output devices may be present with respect to a computer or may be distributed on various nodes of computer system, the system and/or any of the viewing or other devices. In some embodiments, similar input/output devices may be separate from the computer 144 and may interact with the computer or one or more nodes of computer system through a wired or wireless connection, such as through the network interface.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A system, the system comprising:
a plurality of connected cuboctahedrons forming a column for a building, wherein each of the plurality of cuboctahedrons comprises a three-dimensional latticework of uniformly spaced interconnected three-dimensional tetrahedrons and three-dimensional pyramidal-shaped skeletal structures, wherein each of the three-dimensional structures comprises a plurality of legs connected by connectors, wherein a plurality of coupling nuts connect each of the plurality of legs to the connectors, wherein a first end of a short section of a leg is screwed into a first ball, a first end of the coupling nut screws on a second end of the short section and a longer section of the leg is screwed into the second end of the coupling nut and wherein a first end of a second short section of a leg is screwed into a second ball, a first end of a second coupling nut screws on a second end of the second short section and a second end of the longer section of rod is screwed into a second end of a second coupling nut.

2. The system of claim 1, further comprising:
a processor in data communication with a computer readable medium;
a computer program stored in the computer readable medium, the computer program comprising instructions executed by the processor, wherein the computer program performs vibration cancellation on a structure comprised of the plurality of connected cuboctahedrons;
wherein each of the plurality of the connectors contains a sensor and an actuator in data communication with the processor and wherein the computer program monitors the sensors for vibration and controls the actuators to generate a vibration reducing the vibration sensed by the sensors.

3. The system of claim 2, wherein the data communication is provided by a wireless network.

4. The system of claim 2, wherein the actuators are hydraulically actuated to move a mass coupled to the cuboctahedron to cause a vibration cancellation in the cuboctahedron.

5. The system of claim 2, wherein the actuators are electroactive polymer actuated to move a mass coupled to the cuboctahedron to cause a vibration cancellation in the cuboctahedron.

6. The system of claim 1, further comprising:
a processor in data communication with a computer readable medium;
a computer program stored in the computer readable medium, the computer program comprising instructions executed by the processor, wherein the computer program performs vibration cancellation on a structure comprised of the plurality of connected cuboctahedrons; wherein each of the plurality of the coupling nuts contain a sensor and an actuator in data communication with the processor and wherein the computer program monitors the sensors for vibration and controls the actuators to generate a vibration reducing the vibration sensed by the sensors.

7. The system of claim 1, further comprising:
a processor in data communication with a computer readable medium;
a computer program stored in the computer readable medium, the computer program comprising instructions executed by the processor, wherein the computer program performs vibration cancellation on a structure comprised of the plurality of connected cuboctahedrons; wherein each of the plurality of the connectors contain a sensor and an actuator in data communication with the processor and wherein the computer program monitors the sensors for externally induced vibration and controls the actuators to generate an internally induced vibration substantially cancelling the externally induced vibration sensed by the sensors, the system further comprising:
an active vibration control system for attenuating an input vibration field within a building structure resulting from externally applied mechanical disturbance acting upon the cuboctahedron-based structure, the control system comprising:
a plurality of input sensors positioned outside of the cuboctahedron-based structure for sensing incoming disturbances in advance of the disturbances reaching the building structure and for converting such sensed disturbances to a reference signal;
orthogonal component separation means for receiving the reference signal and converting the reference signal into orthogonal reference signal components;
a plurality of output sensors positioned on a building structure for sensing building structure vibrations and for converting such sensed vibrations to orthogonal output signals;
vibration actuator means for imparting a cancellation vibration field to a building structure so as to counteract said input vibration field and to reduce building structure vibrations, said vibration actuator means including orthogonally oriented actuators responsive to orthogonal actuator driving signals;
plural orthogonal feed forward controller means for receiving said orthogonal reference signal components and said orthogonal output signals and for providing orthogonal actuator driving signals to said vibration actuator means, said plural orthogonal feed forward controller means comprising a plurality of feed forward controllers corresponding in number to the number of orthogonal reference signal components, each controller comprising:
first controller input means for receiving one of said orthogonal reference signal components;
second controller input means for receiving a corresponding orthogonal output signal; and digital signal processing means for response to said orthogonal reference signal component and said orthogonal output signal and for providing an orthogonal actuator driving signal to said vibration actuator means so as to drive said orthogonally oriented actuators to impart a cancellation vibration field to the building structure to counteract said input vibration field.

8. The system of claim 7 wherein the computer program is an artificial neural system.

* * * * *